Sept. 24, 1968   J. M. TATE   3,403,319
INVERTER CIRCUIT
Filed Aug. 4, 1967

United States Patent Office 3,403,319
Patented Sept. 24, 1968

3,403,319
INVERTER CIRCUIT
John M. Tate, Levittown, Pa., assignor to ESB
Incorporated, a corporation of Delaware
Filed Aug. 4, 1967, Ser. No. 658,439
3 Claims. (Cl. 321—18)

ABSTRACT OF THE DISCLOSURE

An inverter utilizing a multicore transformer having at least one core to supply drive current proportional to the load current for the transistor switching elements and an output core to supply output voltage transformation. The primary winding of the switching circuit encompasses only the output core of the transformer with coupling between the output core and the drive current core being provided by the inverter output winding which encompasses both cores.

Background of the invention

Fuel cells, thermoelectric generators and solar cells are presently being used as power sources in a variety of electrical systems. While these devices differ in many respects, they all provide a direct current output at a low voltage level. If the output of these sources is to be converted to a high voltage alternating current, a high efficiency low voltage inversion device is required. Most prior art inverter circuits employ voltage feedback to drive the transistor switching elements. Inverters of this type, however, are characterized by efficiencies which vary in accordance with load and power losses are not proportional to operating voltage. Accordingly, they are extremely inefficient for low voltage operation.

Prior art inverter circuits employing current feedback for transistor switching are generally more efficient than the voltage feedback type inverters. This improved efficiency is due to the fact that the drive for the switching transistors is proportional to load current thereby providing a relatively flat efficiency-load characteristic. In addition, the current feedback type inverters generally require less complex transistor biasing circuitry. However, prior art inverters utilizing current feedback have heretofore employed separate current and output transformers. Since each of these transformers has inherent primary winding losses, the efficiency which can be achieved is not obtained. Another disadvantage of prior art current feedback type inverter is that any unbalance in the primary winding circuit will cause the output transformer to saturate allowing a very high current spike of pure dissipative nature. While these current spikes may be reduced by the use of round loop material for the output transformer, this increases transformer size and weight.

The object of the present invention is to provide an inverter particularly adapted to operate from a low voltage source which is characterized by high efficiency and maximum circuit simplicity.

It is another object of the present invention to provide an inverter utilizing a multicore transformer having a single primary winding thereby reducing transformer power losses.

Still another object of the present invention is to provide an inverter circuit that eliminates current spikes due to primary winding circuit unbalance without the use of round loop material for the output transformer.

Summary of the invention

The foregoing objects of the present invention are achieved in a transistor inverter circuit utilizing a transformer having at least one core to supply drive current for the transistor switching elements and an output core to supply the voltage transformation. A pair of transistors operated as synchronous switches cause a DC current from the source to be inverted to flow alternately in opposite directions through a center tap primary winding which is wound on the output core of the transformer. Driving current for the transistors is obtained from a current feedback winding which is wound on the current feedback core of the transformer. Coupling between the output core and the current feedback core is obtained through the output winding which is wound on both cores. A voltage feedback winding wound on both cores can be employed to provide transistor drive under no load conditions.

Brief description of the drawings

A better understanding of the present invention may be had from the following description when read with reference to the accompanying drawings of which.

Description of the preferred embodiments

Figure 1:
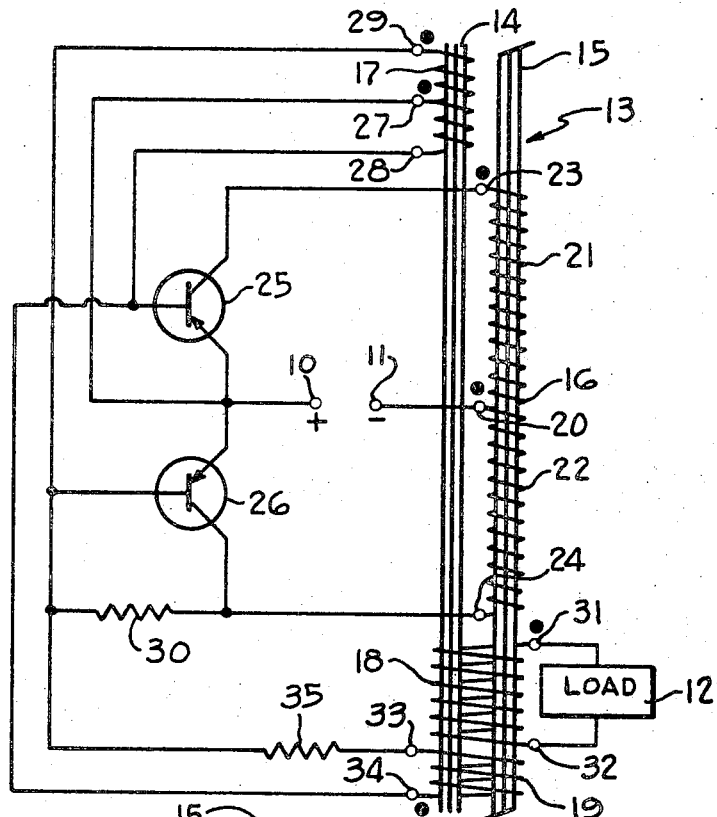
FIG. 1 is a circuit diagram of an inverter circuit in accordance with the present invention.

Referring now to the drawings, FIG. 1 is a circuit diagram of an inverter circuit of the present invention. The circuit is adapted to invert a DC voltage applied across the terminals 10 and 11 to supply an alternating current to a load 12. The inverter utilizes a transformer generally designated 13 having at least one current feedback core 14, an output core 15, a primary winding 16, a current feedback winding 17, an output winding 18 and a voltage feedback winding 19. As shown schematically in the drawings the winding 16 is wound on the core 15, the winding 17 is wound on the core 14 and the windings 18 and 19 are wound on both of the cores 14 and 15. These windings are wound in such a manner as to have the polarities indicated by the polarity marks. In addition, the output core 15 is fabricated from core material having a substantial square hysteresis loop.

The primary winding 16 of the transformer 13 is wound only on the output core 15 and has a center tap 20 and two equal winding sections 21 and 22 having end terminals 23 and 24 respectively. A DC voltage applied across the terminals 10 and 11 causes current to flow alternately in opposite directions through the primary winding sections 21 and 22 in accordance with the operation of a pair of transistor switching elements 25 and 26. The transistors 25 and 26 have the usual emitter, collector and base electrodes. The collector of the transistor 25 is connected to the end terminal 23 of the primary winding section 21 and the emitter of the transistor 25 is connected to the center tap 20 through the terminals 10 and 11. Similarly, the collector of the transistor 26 is connected to the end terminal 24 of the primary winding section 22 and the emitter of the transistor 26 is connected to the center tap 20 through the terminals 10 and 11.

The core 14 of the transformer 13 is utilized to supply driving current for the transistors 25 and 26. This drive current is provided by the current feedback winding 17 which is wound only on the core 14. The current feedback winding 17 has a center tap 27 and end terminals 28 and 29 which are connected to the respective base electrodes of the transistors 25 and 26. The center tap 27 of the current feedback winding 17 is connected to the emitters of the transistors 25 and 26. Starting bias for the transistor 26 is provided by a resistor 30 connected between the collector and base of that transistor.

The output winding 18 of the transformer 13 is adapted to supply the required step-up or step-down voltage transformation of the inverter output. As shown the winding 18 is wound on both cores of the transformer 13 and has a pair of terminals 31 and 32 connected to the load 12. The output winding 18 also supplies coupling between the primary winding 16 and the current feedback winding 17. This coupling is porportional to load current and accordingly, the transistor drive supplied by the winding 17 is proportional to the load current.

A voltage feedback winding 19 engaging both cores of the transformer 13 is also shown in the drawing. This winding is utilized to supply no load feedback drive for the transistors 25 and 26. Accordingly, the winding 19 has end terminals 33 and 34 connected to the base electrodes of the transistors 25 and 26 respectively through a current limiting resistor 35. The winding 19 is not necessary if the inverter is to be operated only under load conditions.

In operation, the resistor 30 applies a starting bias to the base of the transistor 26 making it conductive and permitting a current to flow from a source connected between the terminals 10 and 11 through the primary winding section 22. This current flow sets up a flux in the output core 15 which causes a current flow through the output winding 18 and the load 12. The current flowing through the output winding 18 sets up a flux in the core 14 which causes a current flow in the current feedback winding 17 such that the transistor 26 is biased into further conduction and the transistor 25 is reversed biased. When the output core 15 saturates, current flow in the output winding 18 stops and coupling between the output winding 18 and the current feedback winding 7 is lost. As the flux in the transformer cores collapse, a negative current pulse will be applied on the base of the transistor 25 driving it into conduction and the transistor 26 will be reversed biased turning it off. The transistor 25 will then become conductive until turned off by the saturation of the core 15 and the process is repeated thereby supplying an alternating current to the load 12.

Since current feedback in the inverter is dependent upon load current, the inverter will not operate under no load conditions. To overcome this, a small voltage feedback winding 19 encompassing both cores may be provided to supply feedback drive under no load conditions.

Figure 2:
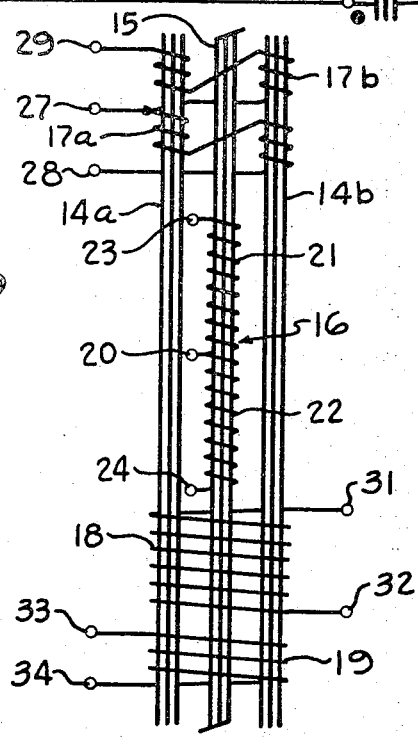
FIG. 2 is a schematic representation of a transformer for the inverter of the present invention having a symmetrical core arrangement.

For simplicity, the transformer 13 has been shown as having 2 cores. It should be understood, however, in order to achieve flux path symmetry and low leakage reactance, it is generally desirable to have a symmetrical core arrangement. This can be achieved by utilizing two current feedback cores symmetrically spaced with respect to the output core. Such an arrangement permits uniform magnetic coupling of all of the windings. Referring now to FIG. 2, there is shown a schematic representation of the output transformer 13 designed to provide this symmetry. The transformer 13 has an output core 15 and a pair of current feedback cores 14a and 14b symmetrically spaced with respect to each other and the output core 15. In an actual transformer, the cores could be a stack of three torroidal cores. As shown, the current feedback winding 17 has two sections 17a and 17b wound on the current feedback cores 14a and 14b respectively. The winding of 17a and 17b are connected in series providing three terminals for connection into the circuit of FIG. 1.

The inverter of the present invention is specifically designed to achieve a high efficiency with a minimum of circuitry and core material. Utilization of a multicore transformer, that is, one providing both current feedback and output voltage transformation greatly simplifies the circuitry required for effective and reliable inverter operation. With the transformer 13 wound as shown, current feedback is proportional to load current and upon saturation of the output core transistor drive is lost preventing the formation of the high current spikes. This permits the use of an output core having a square hysteresis loop thereby reducing the size and weight of the output transformer. In this respect, it should be noted that the inverter does not require carefully matched transistors and transformer windings to insure the lack of these current spikes. An additional feature of the inverter circuit of the present invention is the elimination of the diodes usually included in the emitter-base circuit of the transistors to compensate for unbalance in the emitter-base voltages. It should also be noted that the inverter of the present invention requires no turn off circuit.

Having completely described this invention, that which is claimed as new is:

1. A static inverter comprising, in combination:
   a transformer having at least two cores;
   a center tapped primary winding wound on one of said cores;
   a pair of terminals adapted to be connected to a source of direct current;
   a pair of transistor switching elements each having the usual emitter, collector and base electrode, the emitter-collector electrodes of one of said transistors connecting said terminals between the center tap and one end terminal of said primary winding and the emitter-collector electrodes of the other of said transistors connecting said terminals between the center tap and the other end terminal of said primary winding whereby alternate switching of said transistors causes current applied between said terminals to flow alternately in opposite directions through said primary winding;
   a current feedback winding wound on the other of said cores and connected to said transistors to supply drive current thereto; and
   an output winding wound on both of said cores.

2. Inverter as specified in claim 1 wherein the core upon which said primary winding is wound is a saturable core.

3. A static inverter comprising, in combination:
   a pair of transistor switching elements each having emitter, collector and base electrodes;
   a transformer having at least one core to supply drive current to said transistors and a saturable output core to supply voltage transformation;
   a pair of terminals adapted to be connected to a source of direct current;
   a center tap primary winding wound on said output core, one end terminal of said primary winding being connected through the emitter-collector electrodes of one of said transistors and said terminals to said center tap and the other end terminal of said primary winding being connected through the emitter-collector electrodes of the other of said transistors and said terminals to said center tap whereby alternate switching of said transistors causes current applied between said terminals to flow alternately in opposite directions through said primary winding;
   a current feedback winding wound on said drive current core and connected to said transistors to supply drive current to said transistor; and
   an output winding wound on both of said cores thereby causing the current feedback core to sense the current flowing in the output winding.

References Cited

UNITED STATES PATENTS

| | | | |
|---|---|---|---|
| 3,092,786 | 6/1963 | Bayne | 321—45 XR |
| 3,237,126 | 2/1966 | Baycura et al. | 321—45 XR |
| 3,263,122 | 7/1966 | Genuit | 331—113 XR |
| 3,281,644 | 10/1966 | Moore et al. | 321—45 |
| 3,383,582 | 5/1968 | Bishop et al. | 321—18 |

JOHN F. COUCH, *Primary Examiner.*

W. SHOOP, *Assistant Examiner.*